Figure 1:
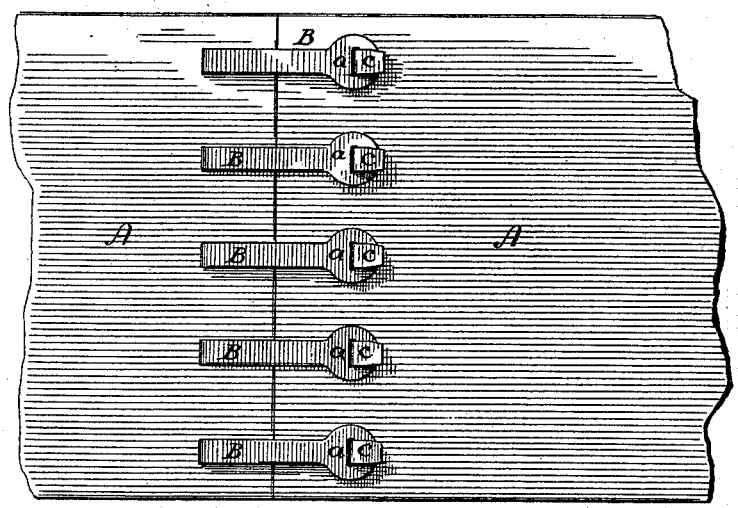
Figure 2:
Figure 3:
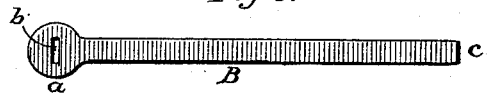

B. LEIDERSDORF & H. M. MENDEL.
Drier.
No. 223,597. Patented Jan. 13, 1880.
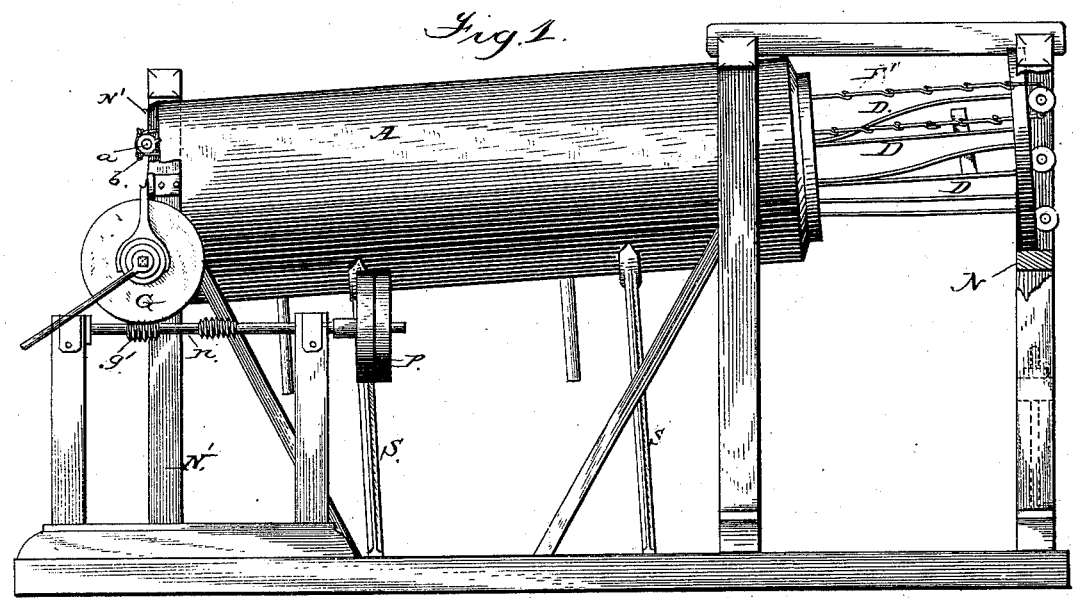
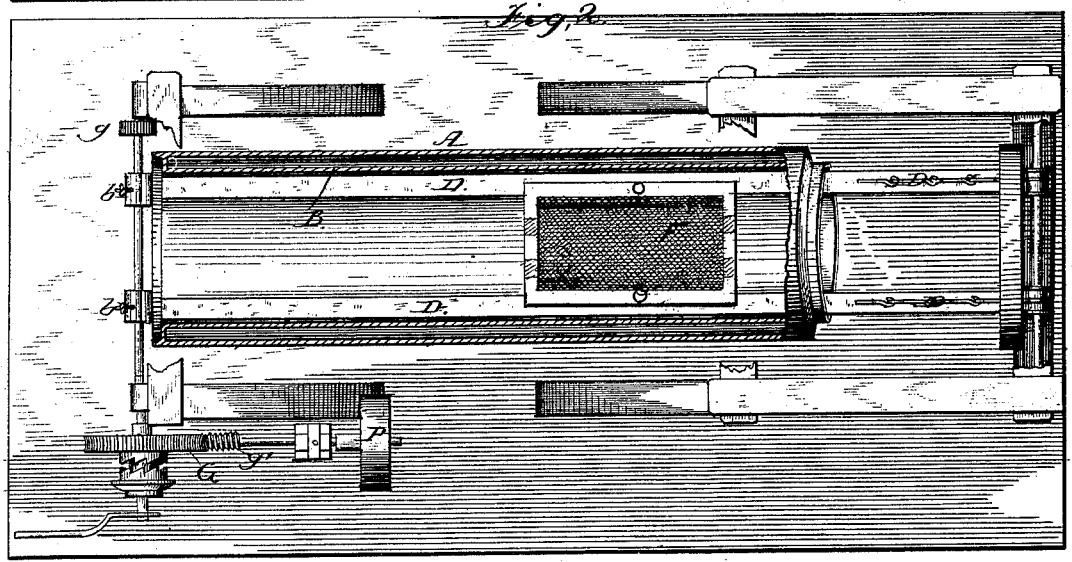
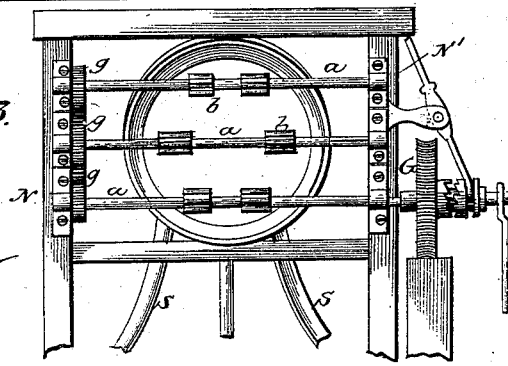
WITNESSES
INVENTORS J. McGEORGE.
Belt-Fastener.

No. 223,598.    Patented Jan. 13, 1880.

Witnesses:
C Clarence Poole
L W Suly

Inventor:
James McGeorge
by Geo. W. Dzero
Atty.